(12) United States Patent
Schmidt

(10) Patent No.: US 7,588,119 B2
(45) Date of Patent: Sep. 15, 2009

(54) HYDROSTATIC RETARDER PUMP AND MOTOR

(75) Inventor: Michael R. Schmidt, Carmel, IN (US)

(73) Assignee: GM Global Technology Operations, Inc., Detroit, MI (US)

( * ) Notice: Subject to any disclaimer, the term of this patent is extended or adjusted under 35 U.S.C. 154(b) by 559 days.

(21) Appl. No.: 11/402,786

(22) Filed: Apr. 12, 2006

(65) Prior Publication Data

US 2007/0243078 A1  Oct. 18, 2007

(51) Int. Cl.
*B60K 17/356* (2006.01)
(52) U.S. Cl. .................. 180/305; 417/273; 417/531
(58) Field of Classification Search .......... 180/305, 180/306, 307; 417/271, 273, 490, 493, 498, 417/531
See application file for complete search history.

(56) References Cited

U.S. PATENT DOCUMENTS

| | | | | |
|---|---|---|---|---|
| 5,482,442 | A * | 1/1996 | Blair et al. | 417/220 |
| 5,505,527 | A * | 4/1996 | Gray et al. | 303/3 |
| 5,642,988 | A | 7/1997 | Zorn | 417/273 |
| 5,716,198 | A | 2/1998 | Hiltemann et al. | 417/273 |
| 6,416,298 | B1 * | 7/2002 | Reichenmiller | 417/273 |
| 6,537,040 | B2 * | 3/2003 | Herrmann et al. | 417/273 |
| 6,652,244 | B2 * | 11/2003 | Ihring et al. | 417/273 |
| 6,655,927 | B2 * | 12/2003 | Herrmann et al. | 417/273 |
| 6,719,080 | B1 * | 4/2004 | Gray, Jr. | 180/165 |
| 7,252,020 | B2 * | 8/2007 | Gray et al. | 74/732.1 |
| 2004/0037710 | A1 * | 2/2004 | Stewart et al. | 417/273 |

OTHER PUBLICATIONS

Application Data Wide Range of Circuits Possible, John Deere.

* cited by examiner

*Primary Examiner*—Christopher P Ellis
*Assistant Examiner*—John D Walters

(57) ABSTRACT

The apparatus of the present invention includes a hydrostatic retarder pump and motor. The apparatus includes a housing rotatably supporting a shaft. The shaft includes a first eccentric portion and a second eccentric portion. A plurality of pistons are disposed within the housing and are engageable with the first eccentric portion. A plurality of valves are also disposed within the housing and are engageable with the second eccentric portion. The plurality of valves are configured to selectively connect the plurality of pistons with a low pressure accumulator or a high pressure accumulator. The rotation of the shaft may be implemented to drive the plurality of pistons and thereby transfer hydraulic fluid from the low pressure accumulator to the high pressure accumulator such that resistance is applied to the shaft and vehicle output is retarded. Alternatively, hydraulic fluid from the high pressure accumulator may be implemented to drive the plurality of pistons and thereby power the vehicle.

12 Claims, 3 Drawing Sheets

HYDROSTATIC RETARDER PUMP AND MOTOR

TECHNICAL FIELD

The present invention pertains generally to a pump/motor configured to selectively operate as an output retarder or a launch motor.

BACKGROUND OF THE INVENTION

When a vehicle is brought to a stop in a conventional manner, the kinetic energy of the vehicle must be absorbed by the braking system. This absorption of energy can degrade brake system components such as the brake pads, and also generates heat which must be dissipated. Additionally, the absorbed energy is typically not preserved for future use such that a potentially valuable source of energy is lost.

SUMMARY OF THE INVENTION

The present invention provides a hydrostatic retarder pump and motor apparatus disposed between a transmission and a differential. The apparatus includes a housing rotatably supporting a shaft. The shaft includes a first eccentric portion and a second eccentric portion. A plurality of pistons are disposed within the housing and are engageable with the first eccentric portion. A plurality of valves are also disposed within the housing and are engageable with the second eccentric portion. The plurality of valves are configured to selectively connect the plurality of pistons with a low pressure accumulator or a high pressure accumulator. The rotation of the shaft may be implemented to drive the plurality of pistons and thereby transfer hydraulic fluid from the low pressure accumulator to the high pressure accumulator such that resistance is applied to the shaft and vehicle output is retarded. Alternatively, hydraulic fluid from the high pressure accumulator may be implemented to drive the plurality of pistons and thereby power the vehicle.

The housing may define a disengagement channel through which hydraulic fluid can be transferred to retract the plurality of pistons out of engagement with the first eccentric portion, and retract the plurality of valves out of engagement with the second eccentric portion such that less resistance is applied to the shaft and the fuel economy of the vehicle is improved.

The housing may define a radially inner channel coupling the low pressure accumulator with the plurality of valves, and a radially outer channel coupling the high pressure accumulator with the plurality of valves.

The housing may define a piston transfer channel coupling the plurality of pistons with the plurality of valves.

The plurality of valves may be spool valves.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
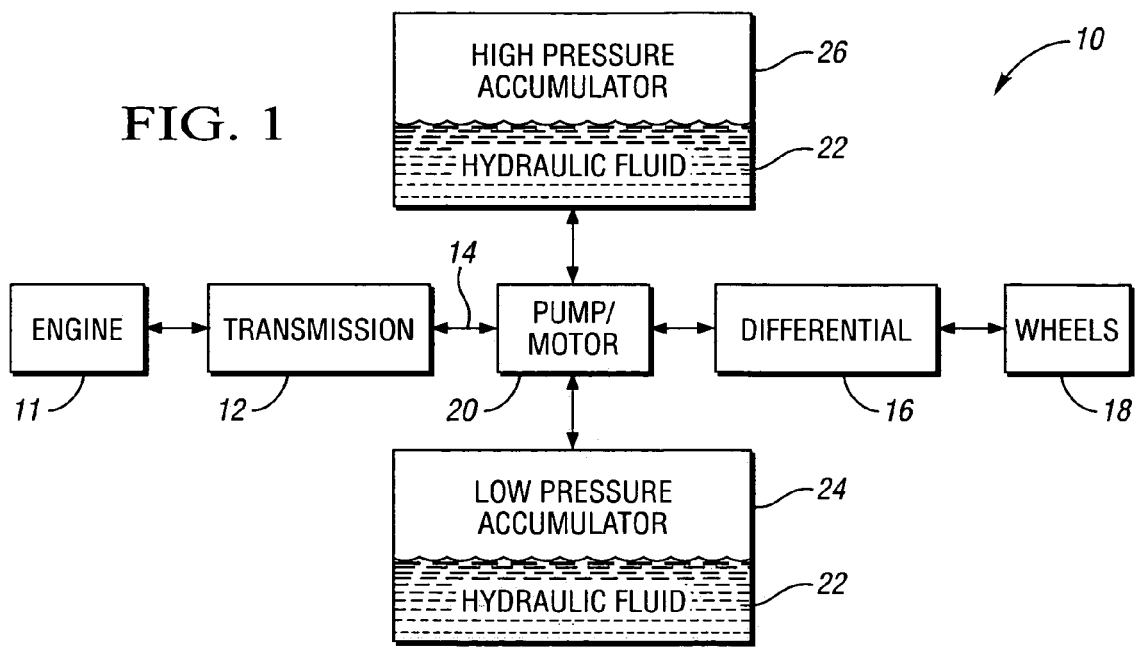
FIG. 1 is a schematic illustration of a vehicle in accordance with the present invention.

Referring to the drawings, wherein like reference numbers refer to like components, FIG. 1 shows a schematic representation of a vehicle 10 in accordance with the present invention. The vehicle 10 includes an engine 11 operatively connected to a transmission 12. The transmission 12 is operatively connected to a differential 16 via a transmission output shaft 14. The differential 16 is coupled to the wheels 18 of the vehicle 10. Output from the engine 11 is transferable through the transmission 12, through the differential 16 and to the wheels 18 in order to drive the vehicle 10.

A pump 20 is operatively connected to the transmission output shaft 14 between the transmission 12 and the differential 16. The pump 20 is preferably a radial piston pump as will be described in detail hereinafter. The pump 20 is operable in one of three modes which are selectable to optimize the performance of the vehicle 10.

During the first operational mode of the pump 20, the pump 20 acts as an output retarder. For purposes of the present invention, an "output retarder" is defined as a device adapted to apply brake torque and thereby slow the vehicle 10. As the vehicle 10 is slowing down, the wheels 18 transfer rotation through the differential 16 thereby back-driving the transmission output shaft 14. The rotation of the back-driven transmission output shaft 14 is implemented to drive or power the pump 20, which is configured to transfer hydraulic fluid 22 from a low pressure accumulator 24 to a high pressure accumulator 26. The low pressure accumulator 24 and the high pressure accumulator 26 are conventional devices known to those skilled in the art and therefore will not be described in detail. The low pressure accumulator 24 preferably stores hydraulic fluid 22 at approximately 200 psi, and the high pressure accumulator 26 preferably stores hydraulic fluid 22 at approximately 5,000 psi.

As the pump 20 is being driven by the rotation of the transmission output shaft 14 to transfer hydraulic fluid 22 from the low pressure accumulator 24 to the high pressure accumulator 26, the pump 20 also applies resistance to the transmission output shaft 14 which acts to slow the vehicle 10. The pump 20 is therefore acting as an output retarder such that the vehicle braking system (not shown) is subjected to less wear and heat. Additionally, at least a portion of the kinetic energy absorbed by the pump 20 is preserved in the form of the pressurized hydraulic fluid 22 within the high pressure accumulator 26.

During the second operational mode of the pump 20, the pump 20 acts as a motor. This mode is preferably selected when the vehicle 10 is accelerating from a stop. In order to implement the pump 20 as a motor, pressurized hydraulic fluid 22 is transferred from the high pressure accumulator 26, through the pump 20, and into the low pressure accumulator 24. This transfer of pressurized hydraulic fluid 22 drives the pump 20 as will be described in detail hereinafter. The hydraulically driven pump 20 generates torque which rotates the transmission output shaft 14. The rotation of the transmission output shaft 14 is transferred through the differential 16 and to the wheels 18 such that the vehicle 10 is driven. The present invention preferably implements the pump 20 as a motor to supplement the power provided by the engine 11 and thereby improve the fuel economy of the vehicle 10. Alternatively, however, implementation of the pump 20 as the sole source of power for a predetermined period of time may also be envisioned.

During the third operational mode of the pump 20, the pump 20 is effectively deactivated. This mode is preferably selected when the vehicle 10 is traveling at a generally constant speed. By deactivating the pump 20, the resistance applied to the transmission output shaft 14 is minimized and spin losses are therefore reduced. In other words, by deactivating the pump 20 when it is not needed, the efficiency and fuel economy of the vehicle 10 are improved.

Figure 2:
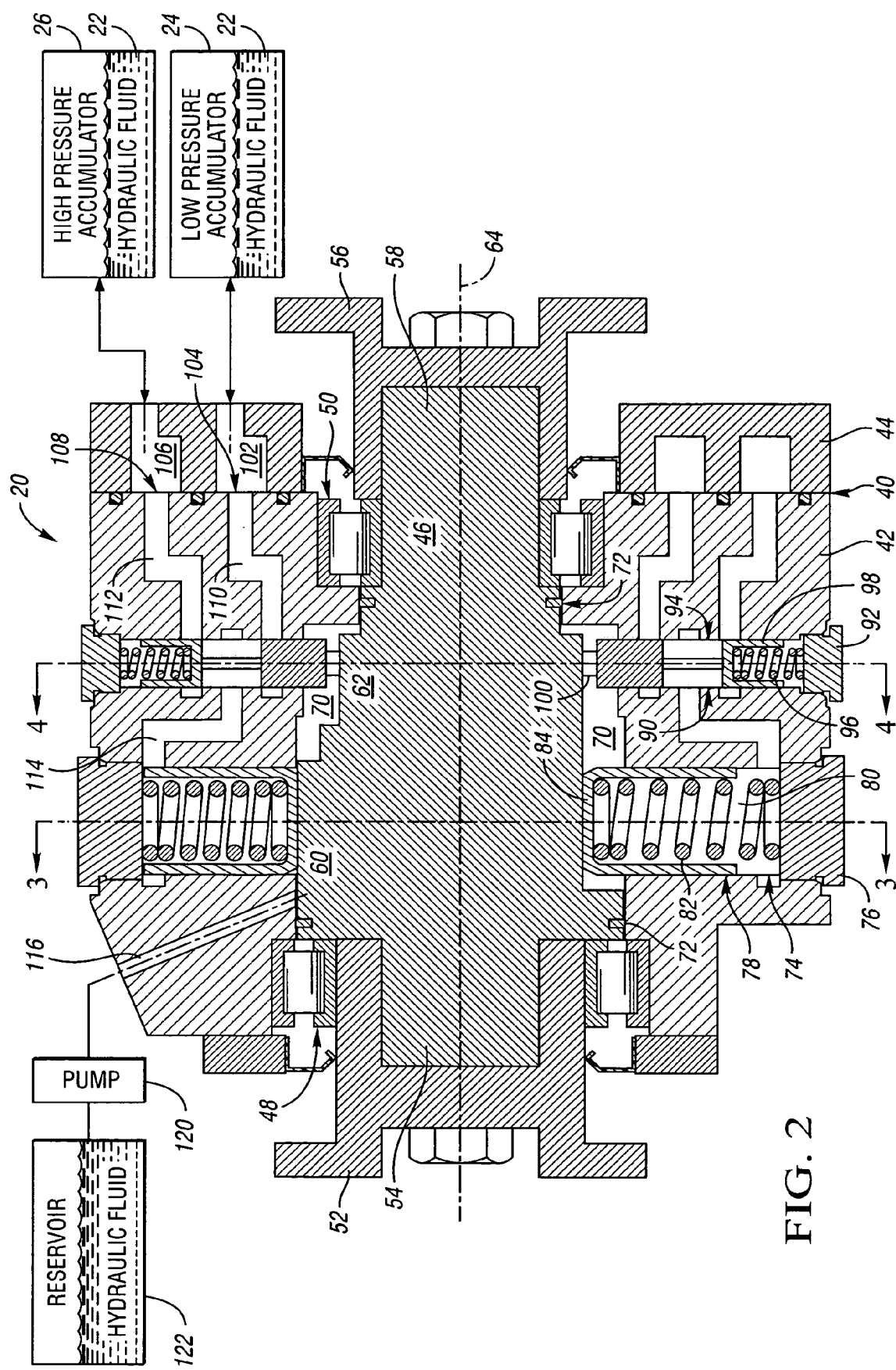
FIG. 2 is a sectional view of a pump in accordance with the present invention.

Referring to FIG. 2, the pump 20 is shown in more detail. The pump 20 has a pump housing 40 which is comprised of two assembled parts, namely a pump body 42 and a cover 44. The pump body 42 rotatably supports a shaft 46 with a first bearing assembly 48 and a second bearing assembly 50. The shaft 46 defines a first end portion 54 and a second end portion 58. The shaft 46 includes a first eccentric portion 60 and a second eccentric portion 62 which are offset relative to the axis of rotation 64 of the remainder of the shaft 46. A core pump chamber 70 is defined radially between the shaft 46 and the pump body 42, and extends axially to include both the eccentric portions 60 and 62. The shaft 46 preferably retains a plurality of seals 72 adapted to engage the pump body 42 and thereby seal the core pump chamber.

A first flange 52 is fixed to the first end portion 54 of the shaft 46, and a second flange 56 is fixed to the second end portion 58 of the shaft 46 such that the first flange 52, the shaft 46 and the second flange 56 rotate together. The first flange 52 is operatively connected to the transmission 12 (shown in FIG. 1), and the second flange 56 is operatively connected to the differential 16 (shown in FIG. 1). Therefore, rotation from the transmission 12 is transmittable through the first flange 52, the shaft 46, the second flange 56, the differential 16 and to the wheels 18 (shown in FIG. 1) in order to drive the vehicle 10 (shown in FIG. 1). Conversely, rotation from the wheels 18 is transmittable through the differential 16, the second flange 56, the shaft 46, the first flange 52, and to the transmission 12.

The pump body 42 defines a plurality of piston cavities 74, which each extend in a radial direction relative to the axis of rotation 64. The piston cavities 74 are generally uniformly spaced in a circular pattern. Each piston cavity 74 is open at its end facing the eccentric portion 60 and is closed at the opposite end in pressure-tight manner by a piston cavity plug 76. A piston 78 is disposed in each of the piston cavities 74, and each piston 78 is displaceable in a radial direction. The pistons 78 are generally hollow thereby defining a piston chamber 80. A piston spring 82 rests against the inner side of the piston cavity plug 76 and its opposite end lies against the head 84 of the hollow piston 78. The piston head 84 is biased into engagement with the eccentric portion 60 by the piston spring 82.

The pump body 42 also defines a plurality of valve cavities 90, which each extend in a radial direction relative to the axis of rotation 64. The valve cavities 90 are generally uniformly spaced in a circular pattern. Each valve cavity 90 is open at its end facing the eccentric portion 62 and is closed at the opposite end in pressure-tight manner by a valve cavity plug 92. A valve 94 is disposed in each of the valve cavities 90, and each valve 94 is displaceable in a radial direction. The valves 94 are preferably spool valves such as those described in U.S. Pat. No. 6,095,192 issued to Gleasman et al., which is hereby incorporated by reference in its entirety. The valves 94 include a valve spring 96 and a valve body 98. The valve spring 96 rests against the inner side of the valve cavity plug 92 and its opposite end engages the valve body 98. The valve body 98 includes an end portion 100 which is biased into engagement with the eccentric portion 62 by the valve spring 96.

The cover 44 defines a first portion 102 of a radially inner channel 104 which couples the low pressure accumulator 24 and the valves 94. The cover 44 also defines a first portion 106 of a radially outer channel 108 which couples the high pressure accumulator 26 and the valves 94. The second portion 110 of the radially inner channel 104, and the second portion 112 of the radially outer channel 108 are defined by the pump body 42. The pump body 42 also defines a piston transfer channel 114 interconnecting the pistons 78 and the valves 94, and a pump deactivation channel 116 interconnecting a hydraulic fluid reservoir 122 with the core pump chamber 70.

Figure 3:
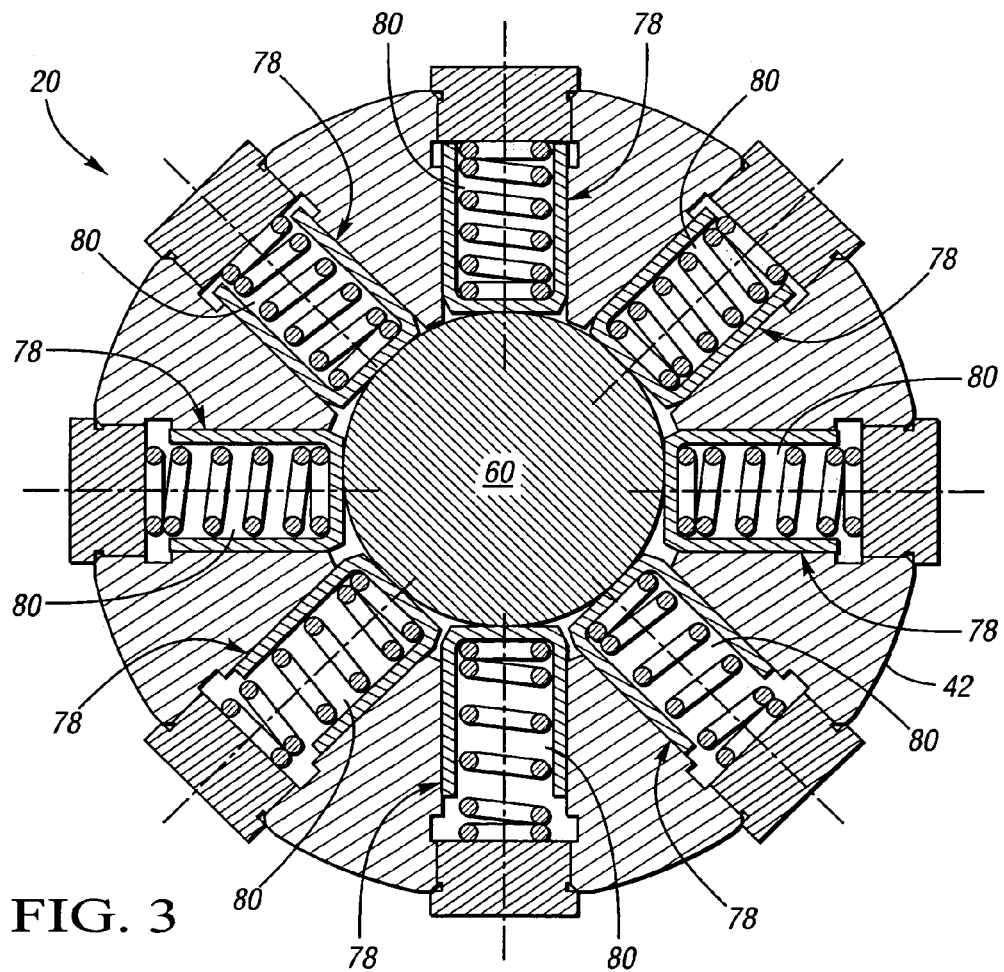
FIG. 3 is a sectional view of a plurality of pistons of the pump of FIG. 2.
Figure 4:
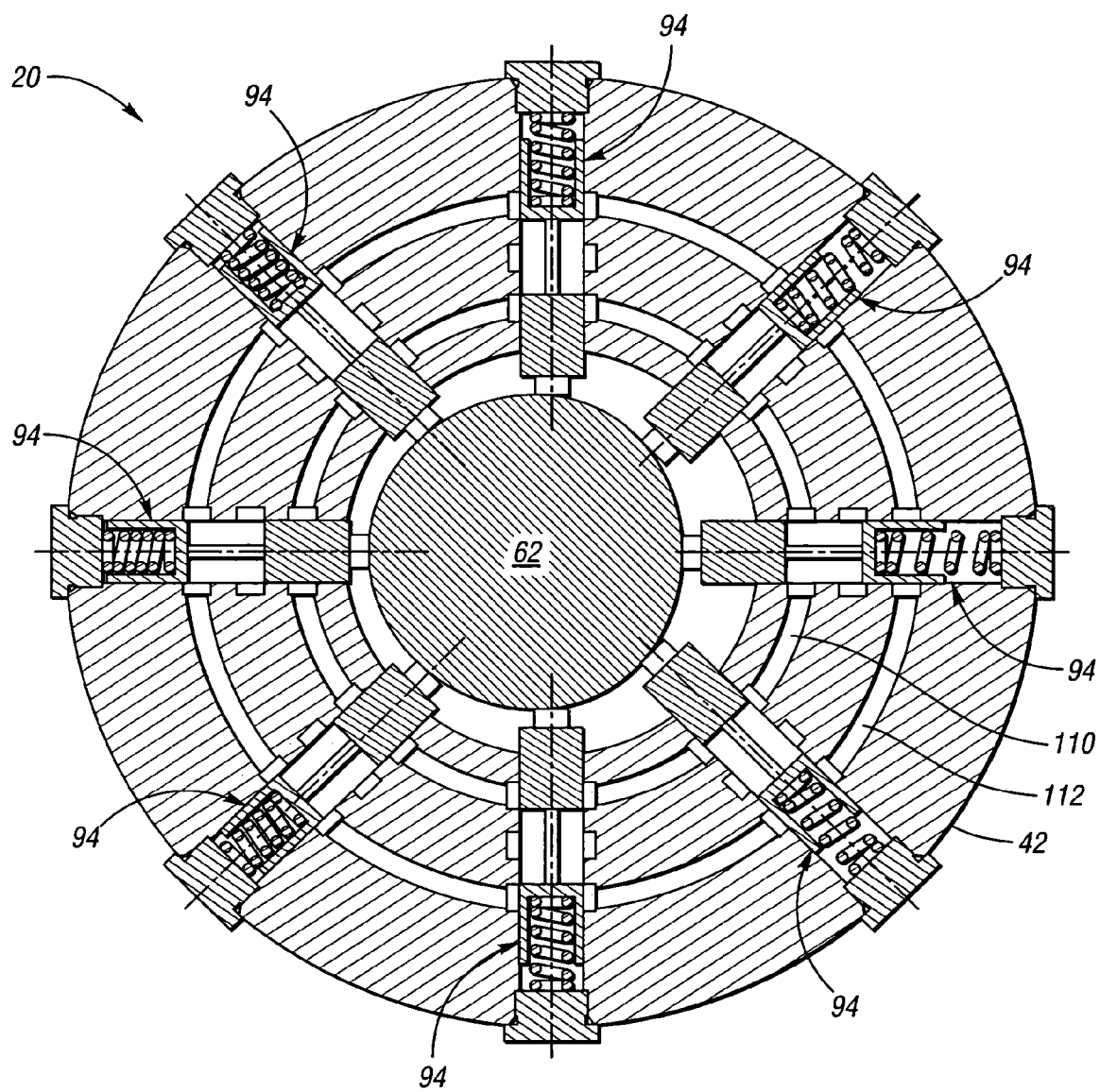
FIG. 4 is a sectional view of a plurality of valves of the pump of FIG. 2.

Having described the apparatus of the present invention, the operation thereof will now be explained. As indicated hereinabove, the pump 20 is operable in one of three modes. Therefore, the operation of the present invention will be described separately for each of the three operational modes. Referring to FIGS. 3 and 4, FIG. 3 shows a sectional view through section 3-3 of FIG. 2, and FIG. 4 shows a sectional view through section 4-4 of FIG. 2.

During the first operational mode of the pump 20 wherein the pump 20 is acting as an output retarder, the vehicle 10 (shown in FIG. 1) is decelerating such that the shaft 46 (shown in FIG. 2) is back-driven by the wheels 18 (shown in FIG. 1). The rotation of the shaft 46 causes the eccentric portion 60 to rotate and thereby engage the pistons 78 such that the pistons 78 are sequentially compressed and released. Similarly, the rotation of the shaft 46 causes the eccentric portion 62 to rotate and thereby engage the valves 94 such that the valves 94 are sequentially compressed and released. According to the preferred embodiment, the eccentric portions 60 and 62 are offset by approximately 90 degrees.

In FIG. 3, the top piston 78, in the 12-o'clock position, is shown fully compressed by the eccentric portion 60, while the opposite bottom piston 78, in the 6-o'clock position, is shown fully extended. As an individual piston 78 goes from being fully compressed to being fully extended, the piston 78 draws hydraulic fluid 22 (shown in FIG. 2) into its piston chamber 80 from the low pressure accumulator 24 (shown in FIG. 2) via the inner channel 104 (shown in FIG. 2). As a piston 78 goes from being fully extended to being fully compressed, the piston 78 pumps the hydraulic fluid 22 out of the piston chamber 80 into the high pressure accumulator 26 (shown in FIG. 2) via the outer channel 108.

In FIG. 4, the valve 94 in the 9-o'clock position is shown fully compressed or retracted by the eccentric portion 62, while the opposite valve 94 in the 3-o'clock position is shown fully extended. As an individual valve 94 goes from being fully compressed to being fully extended, the valve 94 couples the radially outer channel 108 (shown in FIG. 2) and the piston transfer channel 114 (shown in FIG. 2) such that hydraulic fluid 22 (shown in FIG. 2) is transferable therebetween. As a valve 94 goes from being fully extended to being fully compressed, the valve 94 couples the radially inner channel 104 (shown in FIG. 2) and the piston transfer channel 114 such that hydraulic fluid is transferable therebetween.

The combined sequential actuation of the valves 94 by the eccentric portion 62 and the pistons 78 by the eccentric portion 60 operate to transfer hydraulic fluid 22 (shown in FIG. 2) from the low pressure accumulator 24 to the high pressure accumulator 26. Additionally, the pistons 78 and the valves 94 apply resistance to the shaft 46 (shown in FIG. 2) as the hydraulic fluid 22 is being transferred such that the pump 20 acts as an output retarder to slow the vehicle 10 (shown in FIG. 1).

Referring again to FIG. 2, during the first operational mode the pump 20 may function as a variable displacement pump. When the pressure in the deactivation channel 116 is at zero, the pump 20 is operational at maximum displacement. By adding pressure to the deactivation channel 116, the pistons 78 are retracted as will be described in detail hereinafter. By partially retracting the pistons 78, their range of motion is reduced which correspondingly reduces the output of the pump 20. Therefore, the displacement of the pump 20 is selectable by controlling the transfer of hydraulic fluid 22 into the deactivation channel 116. It should be appreciated that, when the pump 20 is acting as a motor, it can only operate at maximum displacement.

Referring again to FIG. 4, during the second operational mode of the pump 20 wherein the pump 20 is acting as a motor, the pump 20 applies torque to the shaft 46 (shown in FIG. 2) which in turn drives the wheels 18 (shown in FIG. 1). The fully compressed or retracted valve 94 shown at the 9-o'clock position of FIG. 4 couples the outer channel 108 (shown in FIG. 2) and the piston transfer channel 114 (shown in FIG. 2) such that high pressure hydraulic fluid 22 (shown in FIG. 2) from the high pressure accumulator 26 (shown in FIG. 2) is transferable to the piston chamber 80 of the partially compressed piston 78 shown at the 9-o'clock position of FIG. 3. The introduction of the high pressure hydraulic fluid 22 into the piston chamber 80 of the partially compressed piston 78 acts to extend the piston 78 until it reaches full extension (as shown at the 6-o'clock position of FIG. 3). After a piston 78 reaches full extension, its complementary valve 94 is released by the eccentric portion 62 to couple the piston transfer channel 114 and the inner channel 104 (shown in FIG. 2) such that the pressurized hydraulic fluid 22 in the piston chamber 80 is transferable to the low pressure accumulator 24 (shown in FIG. 2).

The valves 94 are therefore configured to control the transfer of pressurized hydraulic fluid 22 (shown in FIG. 2) from the high pressure accumulator 26 (shown in FIG. 2) to the pistons 78, and from the pistons 78 to the low pressure accumulator 24 (shown in FIG. 2). As pressurized hydraulic fluid 22 is transferred to each piston 78, the piston 78 is hydraulically extended. By hydraulically extending the pistons 78 in a sequential pattern, the pistons 78 apply torque to the eccentric portion 62 tending to rotate the shaft 46 (shown in FIG. 2) and thereby drive the vehicle 10 (shown in FIG. 1).

During the third operational mode of the pump 20, the pump 20 is effectively deactivated. Referring again to FIG. 2, the third operational mode is selected by transferring pressurized hydraulic fluid 22 through the deactivation channel 116 and into the core pump chamber 70. The pressurized hydraulic fluid 22 is transferred by a pump 120 from a hydraulic fluid reservoir 122. The pump 120 and reservoir 122 are preferably part of the transmission 12 (shown in FIG. 1) such that no additional structure is required to disengage the pump 20.

As pressurized hydraulic fluid 22 is transferred into the core pump chamber 70, the pressure level therein builds. When the pressure level in the core pump chamber 70 exceeds the force applied by the piston return springs 82, the pistons 78 are retracted out of engagement with the eccentric portion 60. Similarly, when the pressure level in the core pump chamber 70 exceeds the force applied by the valve return springs 96, the valves 94 are retracted out of engagement with the eccentric portion 62. By retracting the pistons 78 and valves 94 out of engagement with their respective eccentric portions 60, 62, the shaft 46 is subjected to less rotational resistance and the fuel economy of the vehicle 10 (shown in FIG. 1) is thereby improved.

While the best modes for carrying out the invention have been described in detail, those familiar with the art to which this invention relates will recognize various alternative designs and embodiments for practicing the invention within the scope of the appended claims.

The invention claimed is:

1. A hydrostatic retarder pump and motor apparatus for a vehicle comprising:
   a housing;
   a shaft rotatably supported by the housing, said shaft including a first eccentric portion and a second eccentric portion;
   a plurality of pistons disposed within the housing, said plurality of pistons engageable with said first eccentric portion, said plurality of pistons selectively connectable with one of a low pressure accumulator and a high pressure accumulator; and
   a plurality of valves disposed within the housing, said plurality of valves being configured to selectively connect the plurality of pistons with the low pressure accumulator or the high pressure accumulator;
   wherein the second eccentric portion is engageable with the plurality of valves; and
   wherein shaft rotation may be implemented to drive the plurality of pistons and thereby transfer hydraulic fluid from the low pressure accumulator to the high pressure accumulator such that resistance is applied to the shaft and vehicle output is retarded, and further wherein hydraulic fluid from the high pressure accumulator may be implemented to drive the plurality of pistons and thereby power the vehicle.

2. The hydrostatic retarder pump and motor apparatus of claim 1, wherein said housing defines a disengagement channel through which hydraulic fluid may be transferred to retract the plurality of pistons out of engagement with the first eccentric portion, and the plurality of valves out of engagement with the second eccentric portion such that less resistance is applied to the shaft and the fuel economy of the vehicle is improved.

3. The hydrostatic retarder pump and motor apparatus of claim 2, wherein said housing defines a radially inner channel coupling the low pressure accumulator with the plurality of valves, and a radially outer channel coupling the high pressure accumulator with the plurality of valves.

4. The hydrostatic retarder pump and motor apparatus of claim 3, wherein said housing defines a piston transfer channel coupling the plurality of pistons with the plurality of valves.

5. The hydrostatic retarder pump and motor apparatus of claim 4, wherein said plurality of valves are spool valves.

6. A hydrostatic retarder pump and motor apparatus disposed between the transmission and the differential of a vehicle comprising:
   a housing defining an inner channel in fluid communication with a low pressure accumulator; and an outer channel in fluid communication with a high pressure accumulator;
   a shaft rotatably supported by the housing, said shaft including a first eccentric portion and a second eccentric portion;
   a plurality of pistons disposed within the housing, said plurality of pistons engageable with said first eccentric portion;
   a plurality of valves disposed within the housing, said plurality of valves engageable with said second eccentric portion, said plurality of valves being configured to selectively connect the plurality of pistons with the low pressure accumulator or the high pressure accumulator;

wherein shaft rotation may be implemented to drive the plurality of pistons and thereby transfer hydraulic fluid from the low pressure accumulator to the high pressure accumulator such that resistance is applied to the shaft and vehicle output is retarded, and further wherein hydraulic fluid from the high pressure accumulator may be implemented to drive the plurality of pistons and thereby power the vehicle.

7. The hydrostatic retarder pump and motor apparatus of claim 6, wherein said housing defines a disengagement channel through which hydraulic fluid may be transferred to retract the plurality of pistons out of engagement with the first eccentric portion, and retract the plurality of valves out of engagement with the second eccentric portion such that less resistance is applied to the shaft and the fuel economy of the vehicle is improved.

8. The hydrostatic retarder pump and motor apparatus of claim 7, wherein said housing defines a piston transfer channel coupling the plurality of pistons with the plurality of valves.

9. The hydrostatic retarder pump and motor apparatus of claim 8, wherein said plurality of valves are spool valves.

10. A method for improving the efficiency of a vehicle having a transmission and a differential, said method comprising:

providing a pump disposed mounted to a transmission output shaft between the transmission and the differential, said pump being operatively connected to a low pressure regulator and a high pressure regulator;

determining if the vehicle is decelerating;

driving the pump with the rotation of the transmission output shaft if the vehicle is decelerating, wherein the driven pump transfers hydraulic fluid from the low pressure accumulator to the high pressure accumulator such that resistance is applied to the shaft and vehicle output is retarded;

determining if the vehicle is accelerating; and driving the pump with hydraulic fluid from the high pressure accumulator if the vehicle is accelerating, wherein the driven pump applies torque to the transmission output shaft to power the vehicle.

11. The method of claim 10, further comprising deactivating the pump if the vehicle is traveling at a generally constant speed, wherein deactivating the pump reduces transmission output shaft resistance such that vehicle fuel economy is improved.

12. The method of claim 11, wherein deactivating the pump includes transferring pressurized hydraulic fluid into a deactivation channel of said pump.

* * * * *